US010259046B2

(12) United States Patent
Kovalenko et al.

(10) Patent No.: US 10,259,046 B2
(45) Date of Patent: Apr. 16, 2019

(54) METHOD FOR THE PRODUCTION OF $MSn_x$ NANOPARTICLES AS ANODE MATERIALS FOR A RECHARGEABLE BATTERY

(71) Applicant: Belenos Clean Power Holding AG, Bienne (CH)

(72) Inventors: Maksym Kovalenko, Zurich (CH); Marc Walter, Kloten (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 15/214,050

(22) Filed: Jul. 19, 2016

(65) Prior Publication Data
US 2017/0028476 A1 Feb. 2, 2017

(30) Foreign Application Priority Data

Jul. 30, 2015 (EP) .................................... 15179106

(51) Int. Cl.
*B22F 1/00* (2006.01)
*B22F 9/24* (2006.01)
(Continued)

(52) U.S. Cl.
CPC ............. *B22F 9/24* (2013.01); *B22F 1/0018* (2013.01); *B22F 1/0044* (2013.01); *B22F 9/04* (2013.01);
(Continued)

(58) Field of Classification Search
CPC ........................................................ B22F 9/24
(Continued)

(56) References Cited

U.S. PATENT DOCUMENTS

2007/0275259 A1* 11/2007 Lee ...................... B22F 1/0018
428/546
2009/0090214 A1* 4/2009 Cheng ...................... B22F 9/24
75/370
(Continued)

FOREIGN PATENT DOCUMENTS

| EP | 2 449 141 A2 | 5/2012 |
| WO | WO 2011/008410 A2 | 1/2011 |
| WO | WO 2012/086835 A1 | 6/2012 |

OTHER PUBLICATIONS

Zhang, Co—Sn Alloys as Negative Electrode Materials for Rechargable Lithium Batteries, Journal of The Electrochemical Society, 153(8), A1466-A1471, 2006.*
(Continued)

*Primary Examiner* — Tabatha L Penny
(74) *Attorney, Agent, or Firm* — Oblon, McClelland, Maier & Neustadt, L.L.P.

(57) ABSTRACT

A method for the production of $MSn_x$ nanoparticles, wherein M is an element selected from the group consisting of Co, Mn, Fe, Ni, Cu, In, Al, Ge, Pb, Bi, Ga, and $0<x\leq10$, the method including synthesizing Sn nanoparticles by reducing a tin salt with a solution of a hydride in an anhydrous polar solvent, separating the solid Sn nanoparticles formed from the solution, and washing the Sn nanoparticles, synthesizing M nanoparticles by reducing a metal salt with a solution of a hydride in an anhydrous polar solvent, separating the solid M nanoparticles formed from the solution, and washing the M nanoparticles, mechanical mixing the Sn nanoparticles and the M nanoparticles to convert them into $MSn_x$ nanoparticles.

33 Claims, 6 Drawing Sheets

(51) Int. Cl.
- B22F 9/04 (2006.01)
- B82Y 30/00 (2011.01)
- B82Y 40/00 (2011.01)
- B82Y 99/00 (2011.01)
- H01M 4/04 (2006.01)
- H01M 4/38 (2006.01)
- C22C 1/04 (2006.01)
- H01M 4/134 (2010.01)

(52) U.S. Cl.
CPC .............. *B82Y 30/00* (2013.01); *B82Y 40/00* (2013.01); *B82Y 99/00* (2013.01); *C22C 1/0483* (2013.01); *H01M 4/0404* (2013.01); *H01M 4/134* (2013.01); *H01M 4/387* (2013.01); *B22F 2009/043* (2013.01); *B22F 2009/245* (2013.01); *B22F 2201/02* (2013.01); *B22F 2201/10* (2013.01); *B22F 2201/50* (2013.01); *B22F 2301/15* (2013.01); *B22F 2301/30* (2013.01); *B22F 2998/10* (2013.01); *B22F 2999/00* (2013.01); *C22C 1/0433* (2013.01)

(58) Field of Classification Search
USPC ........................................................ 427/212
See application file for complete search history.

(56) References Cited

U.S. PATENT DOCUMENTS

| | | | |
|---|---|---|---|
| 2009/0226812 A1 | 9/2009 | Golightly et al. | |
| 2010/0330428 A1 | 12/2010 | Dahn et al. | |
| 2011/0281180 A1* | 11/2011 | Kim ..................... | H01M 4/133 429/338 |
| 2012/0237831 A1 | 9/2012 | Golightly et al. | |
| 2012/0301782 A1 | 11/2012 | Dahn et al. | |
| 2013/0207049 A1* | 8/2013 | Negi ..................... | H01M 4/134 252/503 |

OTHER PUBLICATIONS

He, Hydrothermal synthesis and electrochemical properties of nano-sized Co—Sn alloy anodes for lithium ion batteries, Journal of Alloys and Compounds, 508(2010), p. 629-635.*

Chee, Reduction Synthesis of Tin Nanoparticles Using Various Precursors and Melting Behavior, Electronic Materials Letters, vol. 8, No. 6 (2012), p. 587-593.*

Fang, Preparation, microstructure, and electrochemical properties of Sn—Co—C anode mateirals using composited carbon sources, J Solid State Electrochem (2013) 17:2521-2529.*

Darwiche, Better Cycling Performances of Bulk Sb in Na-Ion Batteries Compared to Li-Ion Systems: An Unexpected Electrochemical Mechanism, Journal of the American Chemical Society, 2012, 134, 20805-20811.*

Beaulieu et al., Nanocomposites in the Sn—Mn—C system produced by mechanical alloying, Journal of Alloys and Compounds 297 (2000), p. 122-128 (Year: 2000).*

Ferguson, Study of Sn30(Co1-xFex)30C40 Alloy Negative Electrode Materials Prepared by Mechanical Attriting, Journal of The Electrochemical Society, 156 (1), A13-A17 (2009) (Year: 2009).*

Beaulieu et al., The Reaction of Lithium with Sn—Mn—C Intermetallics Prepared by Mechanical Alloying, Journal of The Electrochemical Society, 147 (9) p. 3237-3241 (2000) (Year: 2000).*

Ferguson, $(Sn0.5Co0.5)1-yCy$ Alloy Negative Electrode Materials Prepared by Mechanical Attriting, Journal of The Electrochemical Society, 156 (3), A204-A208 (2009) (Year: 2009).*

European Search Report dated Jan. 29, 2016 in European application 15179106.8, filed on Jul. 30, 2015.

Ricardo Alcantara et al. "Structural and Electrochemical Properties of Micro- and Nano-Crystalline CoSn Electrode Materials" ChemPhysChem 2008, www.chemphyschem.org, Jun. 2008, 7 pages.

Sang-Soo Chee et al. "Reduction Synthesis of Tin Nanoparticles Using Various Precursors and Melting Behavior," Electronic Materials Letters, vol. 8, Dec. 2012, 7 Pages.

X. Liu et al. "Melting behavior and the correlation of Sn distribution on hardness in a nanostructured Al—Sn alloy," Materials Science and Engineering A 506, Apr. 2009, 7 Pages.

* cited by examiner

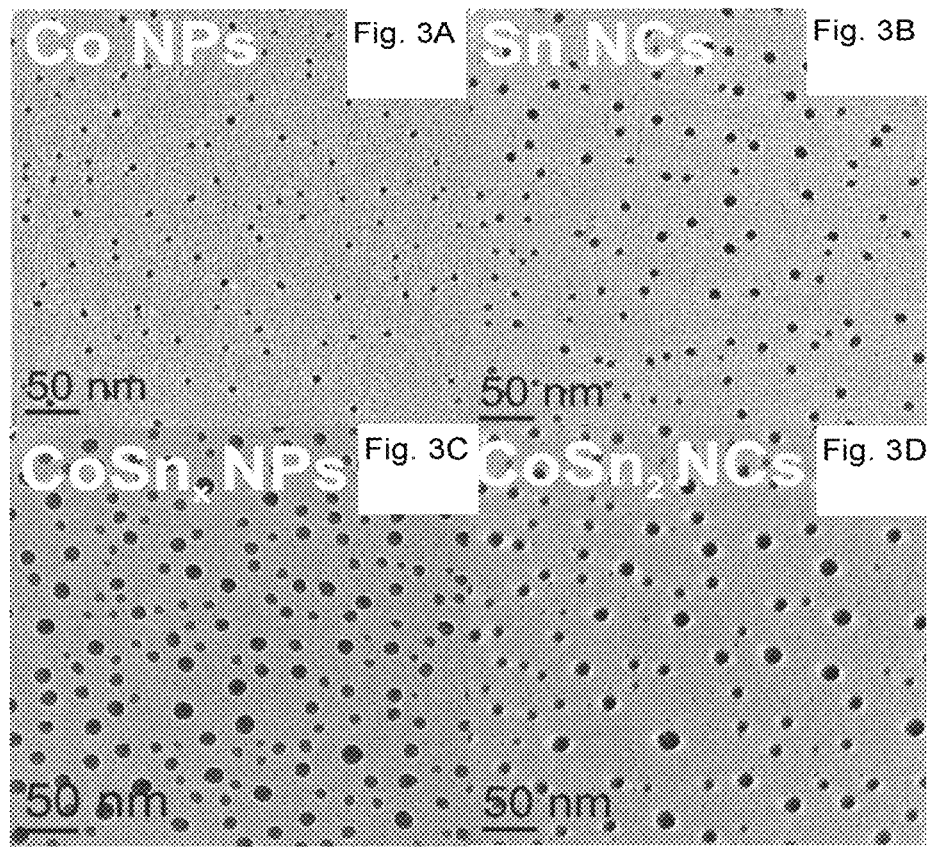
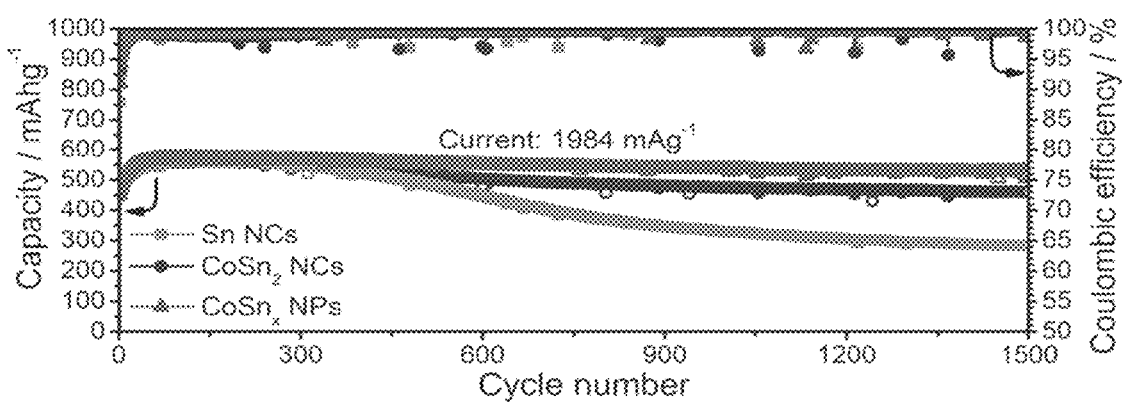
Fig. 4

METHOD FOR THE PRODUCTION OF MSn$_x$ NANOPARTICLES AS ANODE MATERIALS FOR A RECHARGEABLE BATTERY

This application claims priority from European Patent Application No. 15179106.8 filed on Jul. 30, 2015; the entire disclosure of which is incorporated herein by reference.

FIELD OF THE INVENTION

The present invention generally relates to a method for the production of MSn$_x$ nanoparticles as anode materials for a rechargeable battery, in particular a sodium-ion or a lithium-ion battery, and to a method for producing an anode comprising such materials.

BACKGROUND OF THE INVENTION

Despite extensive research on materials for rechargeable Lithium-ion batteries in the last decades, graphite is still the most widely used anode material for commercial cells. However, graphite has a relatively low specific and volumetric capacity (372 mAhg$^{-1}$; 820 mAhcm$^{-3}$) compared to many alloying (e.g. Si, Ge, Sn) and conversion-type materials (e.g. Fe$_3$O$_4$, MoS$_2$, SnSb). Although these materials suffer commonly from massive volume changes occurring during lithiation/delithiation, it has been demonstrated for a multitude of systems that this issue can be mitigated by using nanostructured materials.[1] Nevertheless, commercialization of such high-capacity alloying or conversion-type anodes has been hampered for several reasons. Especially for conversion-type anodes, often a major fraction of the capacity is obtained at potentials beyond 1.0 V vs. Li$^+$/Li, resulting in low energy densities for the corresponding full-cells. Secondly, often synthesis of battery materials is too cost-intensive or too complicated to be implemented on the industrial scale. Among the few materials, which are realistic candidates to replace graphite in commercial cells is Sn, because it combines most of the crucial properties: high volumetric and specific capacities (~7300 mAhcm$^{-3}$, 992 mAhg$^{-1}$), low delithiation potential, high electric conductivity and reasonable price. In fact, anodes based on an amorphous Sn—Co—C nanocomposite are currently being used in Sony's Nexelion™ battery which has triggered intensive research on Co—Sn based anodes for Lithium-ion batteries.[2]

Therefore, suitable materials to replace graphite as anode are urgently needed in order to improve the energy density of rechargeable battery, in particular Lithium-ion batteries, for increasingly important applications such as portable electronics or electric cars.

It is therefore necessary to develop a cheap and simple procedure that allows the production of MSn$_x$ nanoparticles showing high electrochemical performance as anode materials for rechargeable battery, in particular Lithium-ion batteries.

DISCLOSURE OF THE INVENTION

Hence, it is a general object of the invention to provide a method for the production of MSn$_x$ nanoparticles, wherein M is an element selected from the group consisting of Co, Mn, Fe, Ni, Cu, In, Al, Ge, Pb, Bi, Ga, and $0<x\leq10$, and preferably $0<x\leq3$ According to the invention, the method for the production of MSn$_x$ nanoparticles comprises the steps of:

- synthesizing Sn nanoparticles by reducing a tin salt with a solution of a hydride in an anhydrous polar solvent, separating the solid Sn nanoparticles formed from the solution, and washing the Sn nanoparticles,
- synthesizing M nanoparticles by reducing a metal salt with a solution of a hydride in an anhydrous polar solvent, separating the solid M nanoparticles formed from the solution, and washing the M nanoparticles,
- mechanical mixing said Sn nanoparticles and said M nanoparticles to convert them into nanoalloys of MSn$_x$ nanoparticles.

It is a further object of the invention to provide a method for producing an anode for rechargeable battery, in particular Sodium-ion or Lithium-ion batteries, said anode comprising a tin based material obtained by the method of the present invention.

Preferably, the molar ratio (M/Sn) of M nanoparticles and Sn nanoparticles for the mechanical mixing step may be comprised between 1:1 and 1:3.

Advantageously, the mechanical mixing may be obtained by ball-milling which may be performed in air or in inert gas, for example under nitrogen. Preferably, the ball-milling is performed in air.

In some preferred embodiments M is Co, and x may be preferably about 2.

The reduction reaction of the tin salt is preferably performed at elevated reaction temperature such as at a temperature comprised between 50° C. and 70° C.

The reduction reaction of the metal salt is preferably performed at more elevated reaction temperature such as at a temperature comprised between 60° C. and 180° C., depending on the reactivity of the metal salt.

Examples for suitable hydrides are NaBH$_4$, lithium hydride, sodium hydride, potassium hydride, magnesium hydride, calcium hydride, tributyltinhydride, diisobutyl aluminum hydride, lithium aluminum hydride, lithium triethylborohydride and mixtures thereof. A preferred hydride is NaBH$_4$.

Examples for anhydrous polar solvents are 1-methyl-2-pyrrolidone (NMP), hexamethylphosphoramide, 1,3-dimethyl-2-imidazolidinone, 1,3-dimethyl-3,4,5,6-tetrahydro-2(1H)-pyrimidinone, linear ether such as glyme, diglyme, triethylene glycol dimethylether but not limited thereto, sulfoxide such as dimethylsulfoxide or sulfolane but not limited thereto, and mixtures thereof. A preferred anhydrous polar solvent is NMP.

Examples for suitable tin salts are tin chloride, tin fluoride, tin bromide, tin iodide, tin oxide, tin sulfide, sodium stannate trihydrate, tetrabutyltin, and mixtures thereof, preferably tin chloride.

Examples for suitable alloying metal salts are M chlorides (MCl$_2$), M fluorides, M bromides, M iodides, M oxides, M sulfides, M sulfates and mixtures thereof, preferably mixtures of Co salts, and most preferably Co chloride (CoCl$_2$).

The reduction reaction of the tin salt or of the metal salt respectively may be performed in inert gas, preferably under nitrogen or may also be performed in air.

In a preferred method, the step of synthesizing the Sn nanoparticles may comprise the steps of:
- preparing a solution of hydride in anhydrous solvent and at least one solution of tin salt in anhydrous solvent,
- heating the solution of hydride to the reaction temperature of the reduction reaction of the tin salt, and
- starting the reduction reaction when the reaction temperature of the reduction reaction of the tin salt is reached by quick injection of the one or more tin salt solutions into the solution of hydride to generate a reaction mixture. Quick means that addition was performed with highest possible speed and without interruption. In the reaction mixture, Sn nanoparticles are generated by adding the one or more tin salt to the hydride, and are formed instantaneously.

In another embodiment, the step of synthesizing the Sn nanoparticles may comprise the steps of:
preparing a solution of one or more tin salts in anhydrous solvent and at least one solution of hydride in anhydrous solvent,
heating the solution of tin salts to the reaction temperature of the reduction reaction of the tin salt, and
starting the reduction reaction when the reaction temperature of the reduction reaction of the tin salt is reached by quick injection of the hydride solution into the solution of one or more tin salts to generate a reaction mixture in which Sn nanoparticles are formed instantaneously.

In a preferred method, the step of synthesizing the M nanoparticles may comprise the steps of:
preparing a solution of hydride in anhydrous solvent and at least one solution of metal salt in anhydrous solvent,
heating the solution of hydride to the reaction temperature of the reduction reaction of the metal salt, and
starting the reduction reaction when the reaction temperature of the reduction reaction of the metal salt is reached by quick injection of the one or more metal salt solutions into the solution of hydride to generate a reaction mixture. Quick means that addition was performed with highest possible speed and without interruption. In the reaction mixture, M nanoparticles are generated by adding the one or more metal salt to the hydride, and are formed instantaneously.

In another embodiment the step of synthesizing the M nanoparticles may comprise the steps of:
preparing a solution of one or more metal salts in anhydrous solvent and at least one solution of hydride in anhydrous solvent,
heating the solution of metal salts to the reaction temperature of the reduction reaction of the metal salt, and
starting the reduction reaction when the reaction temperature of the reduction reaction of the metal salt is reached by quick injection of the hydride solution into the solution of one or more metal salts to generate a reaction mixture in which M nanoparticles are formed instantaneously.

Advantageously, the reaction mixture, which has been generated during one of the syntheses described above, is cooled to room temperature immediately after injection. More particularly, in a preferred embodiment the reaction mixture formed by combining the tin salt solution or the metal salt solution respectively with the hydride solution is cooled to room temperature immediately after injection of the one or more tin salt solutions or of the one or more metal salt solutions respectively, by using for example a water-ice bath.

Preferably, the solid Sn nanoparticles or the M nanoparticles which are formed are separated from their respective reaction mixture by centrifugation.

Then the obtained solid Sn nanoparticles or the M nanoparticles are respectively washed preferably first with a solvent as dimethyl sulfoxide (DMSO) and then with water.

Prior to mechanical mixing, the Sn or M nanoparticles may be dried in a vacuum oven at room temperature.

The method of the invention uses simple preparative procedures based on inexpensive precursors for synthesizing M-Sn based nanoparticles combining wet-chemical synthesis and mechanical ball-milling.

An anode may be prepared by mixing the $MSn_x$ nanoparticles obtained as described above, carbon black, carboxy methyl cellulose (CMC) and water. The aqueous slurry obtained is then coated on a current collector and subsequently dried prior to battery assembly.

Using such an anode, a Lithium-ion battery or a Sodium-ion battery may be produced according to procedures well known in the art.

BRIEF DESCRIPTION OF THE DRAWINGS

The invention will be better understood and objects other than those set forth above will become apparent when consideration is given to the following detailed description thereof. This description makes reference to the annexed drawings which show:

FIG. 4. Capacity retention for Sn NCs, $CoSn_2$ NCs and $CoSn_x$ NPs in lithium-ion half-cells at a current of 1984 $mAg^{-1}$ within the potential range 0.005-1.0 V FIGS. 5A-5C. Galvanic charge/discharge curves for Sn NCs (FIG. 5A), $CoSn_2$ NCs (FIG. 5B) and $CoSn_x$ NPs (FIG. 5C) corresponding to FIG. 4.

MODES FOR CARRYING OUT THE INVENTION

Figure 1:
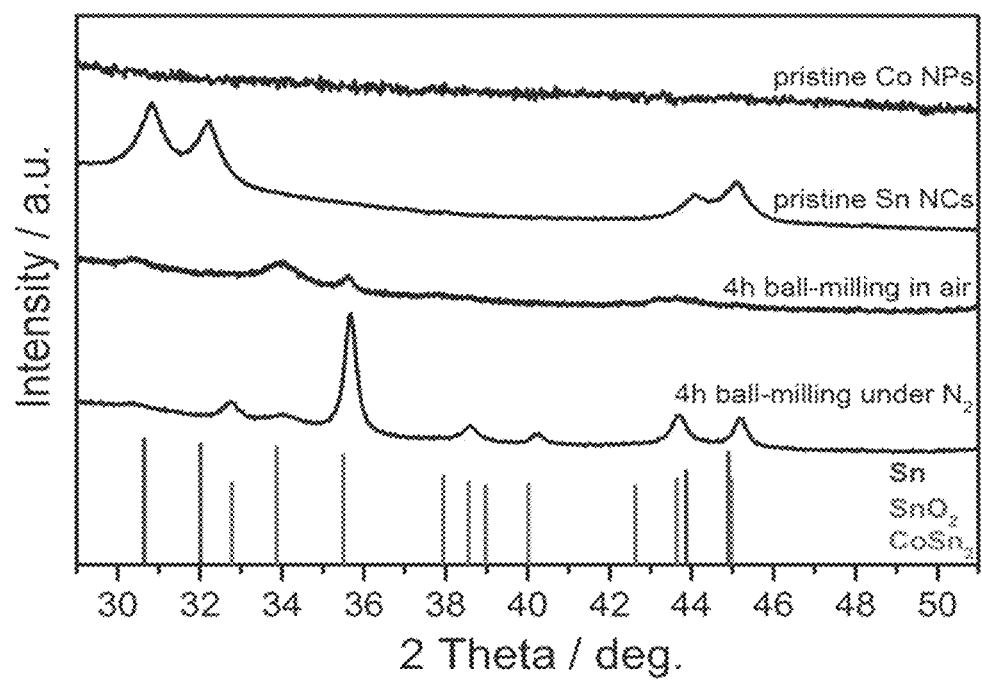
FIG. 1. X-ray diffraction (XRD) patterns of Co NPs, Sn NCs, $CoSn_x$ NPs prepared by ball-milling in air and $CoSn_2$ NCs prepared by ball-milling under nitrogen atmosphere by the method of the invention FIG. 2. EDX-spectrum of amorphous Co NPs FIGS. 3A-3D. Transmission electron microscopy (TEM) images of Co NPs (FIG. 3A), Sn NCs (FIG. 3B), $CoSn_x$ NPs (FIG. 3C) and $CoSn_2$ NCs (FIG. 3D)

According to the process of the invention, first Sn nanoparticles (NPs) and M NPs are synthesized separately by reducing the respective metal chloride with a solution of hydride in an anhydrous polar solvent.

In a typical synthesis of Sn or M NPs, in particular Co NPs, a suitable amount of a hydride such as $NaBH_4$ is dissolved in an appropriate amount of anhydrous polar solvent such as 1-methyl-2-pyrrolidone (NMP) and heated while stirred. For the synthesis of Sn NPs, upon reaching the desired temperature, such as 60° C., a solution of a tin salt, such as $SnCl_2$, in anhydrous solvent, such as NMP, is injected quickly. For the synthesis of M NPs, upon reaching the desired temperature, such as 150° C. for M=Co or 120° C. for M=Mn, Fe, Ni, a solution of a metal salt, such as $CoCl_2$, $MnCl_2$, $FeCl_2$, $NiCl_2$, in anhydrous solvent, such as NMP, is injected quickly.

Solid Sn NPs or M NPs are formed immediately. After the injection the respective suspensions are cooled to room temperature, e.g. with a water-ice bath. The respective obtained materials are separated from their solution by centrifugation and washed once with dimethyl sulfoxide (DMSO) and two times with water to remove unreacted $NaBH_4$ and water-soluble side-products such as NaCl. The respective reaction products can be finally dried in the vacuum oven at room temperature. Typically the reaction yields the desired product in amounts of 67% for Sn NPs, 98% for Co NPs, 36% for Fe NPs, 16% for Mn NPs and 34% for Ni NPs.

In the above indicated methods the following chemicals in general are suitably applied to obtain Sn NPs or M NPs. However, to account for the different reactivity of $MCl_2$ and $SnCl_2$ different reaction temperatures and precursor concentrations are used:

I. As Anhydrous Solvent Other than NMP

Any amide such as hexamethylphosphoramide, 1,3-dimethyl-2-imidazolidinone or 1,3-dimethyl-3,4,5,6-tetrahydro-2(1H)-pyrimidinone.

II. As Substitution for $NaBH_4$

Any alkali or earth alkali hydride such as lithium hydride, sodium hydride, potassium hydride, magnesium hydride, calcium hydride or other metal hydrides such as tributyltinhydride, diisobutyl aluminum hydride, lithium aluminum hydride or lithium triethylborohydride.

III. As Substitution for $SnCl_2$

Any tin halide such as tin fluoride, tin bromide, tin iodide; any tin oxide, tin sulfide, sodium stannate trihydrate, or tetrabutyltin.

IV. As Substitution for $MCl_2$

Any metal halide such as metal fluoride, metal bromide, metal iodide; any metal oxide, metal sulfide or metal sulfate.

The above indicated chemicals may be used alone or in combination with one or more other members of their respective group I to IV.

The particles sizes may be influenced by several characteristics such as amount of hydride, reaction temperature and cooling speed.

Depending on the amount of $NaBH_4$ employed the size of the NPs can be varied, i.e. the higher the amount of $NaBH_4$ the smaller the particles. In addition, to produce NPs of small sizes with high yield an excess of $NaBH_4$ is necessary.

Sn NPs or M NPs can also be produced at room temperature, however, the formation of smaller NPs is likely to be favored at elevated temperatures.

Sn NPs with a diameter of approximately 5-10 nm can be obtained by employing about a 96 fold excess of $NaBH_4$ as reducing agent and fast cooling down directly after the injection of the $SnCl_2$.

M NPs with a diameter of approximately 4-10 nm can be obtained by employing about a 4-8 fold excess of $NaBH_4$ as reducing agent and fast cooling down directly after the injection of the $MCl_2$.

The fast cooling down can be achieved by any adequate cooling technique known to the person skilled in the art.

In addition, it has been found that such syntheses of Sn or M NPs may be performed in air which significantly reduces the costs (material as well as working hours).

Besides of being easy to perform and comparatively cheap the method for preparing the Sn NPs and M NPs used in the present invention has several advantages compared with methods described in literature. The advantages of this synthetic procedure are the following:

I. No surfactant needs to be used.
II. Reaction can also be done in air.
III. Inexpensive and safe chemicals: the herein preferably used $NaBH_4$ is the least expensive metal hydride,
IV. Washing procedure: the obtained Sn or M NPs are simply washed with water in air.
V. Depending on the excess of $NaBH_4$ used and the reaction temperature, the size of the particles can be tuned.

After the synthesis of the Sn NPs and of the M NPs, mixtures of Sn NPs and M NPs are prepared. The molar ratio of M nanoparticles and Sn nanoparticles in these mixtures is comprised between 1:1 and 1:3.

The mixtures of Sn NPs and M NPs are ball-milled either in air or under nitrogen with the goal to alloy the materials and obtain $MSn_x$ nanoparticles. Advantageously, the M nanoparticles and Sn nanoparticles are ball-milled for 2 to 4 hours, at a frequency of 1800 to 2400 rpm.

An anode may be prepared by mixing $MSn_x$ NPs, carbon black, CMC and water, preferably by using a ball-mill for e.g. 1 h. The aqueous slurry obtained is then coated on a current collector like a Cu current collector, and subsequently dried, e.g. overnight at 80° C. under vacuum prior to battery assembly.

Experimental Part

I. Materials Used

Chemicals and solvents: Tin chloride $SnCl_2$ (99.9%, Alfa Aesar), $CoCl_2$ (98%, Sigma-Aldrich), 1-methyl-2-pyrrolidone (NMP, anhydrous, 99.5%, Fisher BioReagents).

Battery components: Carbon black (CB, Super C65, provided by TIMCAL), carboxymethylcellulose (CMC, Grade: 2200, Daicel Fine Chem Ltd.); fluoroethylene carbonate (FEC, Solvay, battery grade), 1 M solution of $LiPF_6$ in ethylene carbonate/dimethyl carbonate (EC:DMC:1:1, Merck, battery grade), glass microfiber separator (GF/D, Whatman, Cu foil (9 μm, MTI Corporation)

II. Methods

Synthesis of $CoSn_x$ NPs

Example 1: Synthesis of $CoSn_2$ Nanocrystals (NCs)

According to the invention, the synthesis of $CoSn_2$ NCs comprises the synthesis of Sn NCs, the synthesis of Co NPs, and the synthesis of $CoSn_2$ NCs by ball-milling of the Sn NCs and Co NPs:

Synthesis of Sn NCs:

In a typical synthesis of Sn NCs, 96 mmol of $NaBH_4$ were dissolved in 85 mL anhydrous NMP and heated to 60° C. under nitrogen, while stirred mechanically. Upon reaching 60° C. a solution of 1 mmol $SnCl_2$ previously dissolved in anhydrous NMP was injected quickly and the reaction mixture was immediately cooled to room temperature using a water-ice bath. The reaction product was separated from the solution by centrifugation and washed once with dimethyl sulfoxide and then two times with water. Sn NCs were obtained.

The reaction yield was 80 mg (67%). The XRD pattern of the obtained product showed only peaks corresponding to crystalline β—Sn (FIG. 1, indexed to tetragonal Sn, space group 141/amd (141), a=5.831 Å, c=3.182 Å, ICDD PDF entry No.: 00-004-0673). Analysis of the reaction product by TEM showed that particles were polydisperse with sizes of 5-10 nm (FIG. 3B).

Synthesis of Co NPs:

In a typical synthesis of Co NPs, a similar procedure was used as for Sn NCs with modifications, in particular reaction temperature and precursor concentrations): 32 mmol of $NaBH_4$ were dissolved in 15 mL anhydrous NMP and heated to 150° C. under nitrogen, while stirred mechanically. Upon reaching 150° C. a solution of 8 mmol $CoCl_2$ previously dissolved in anhydrous NMP was injected quickly and the reaction mixture was immediately cooled to room temperature using a water-ice bath. The reaction product was separated from the solution by centrifugation and washed once with dimethyl sulfoxide and then two times with water. Co NPs were obtained.

Figure 2:
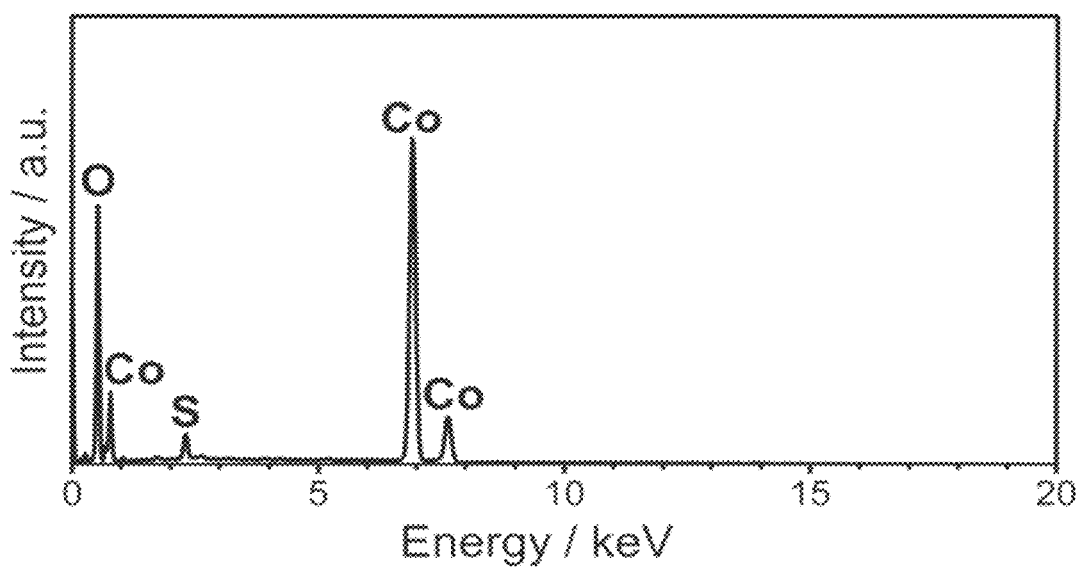
Figure 5C:
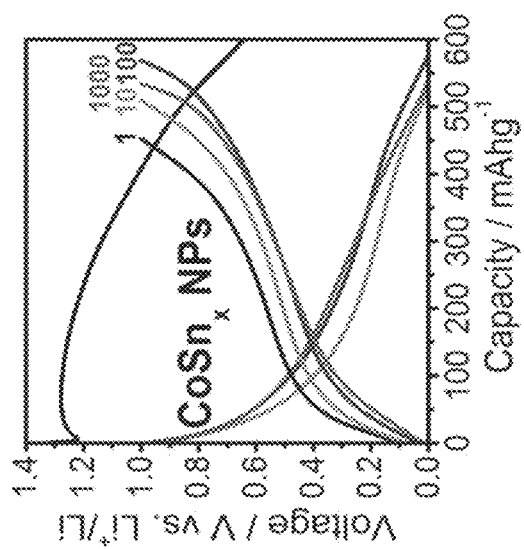
Figure 5B:
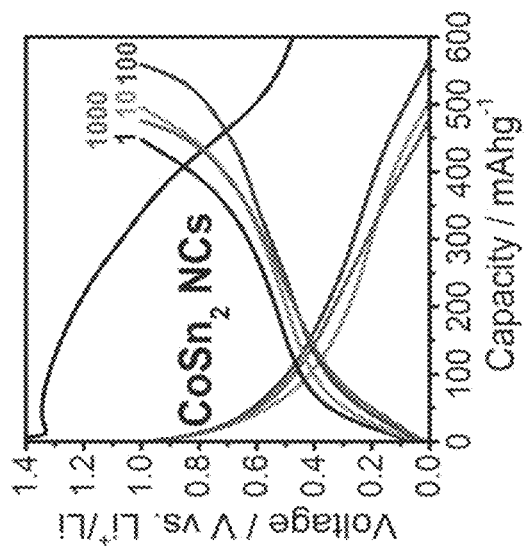
Figure 5A:
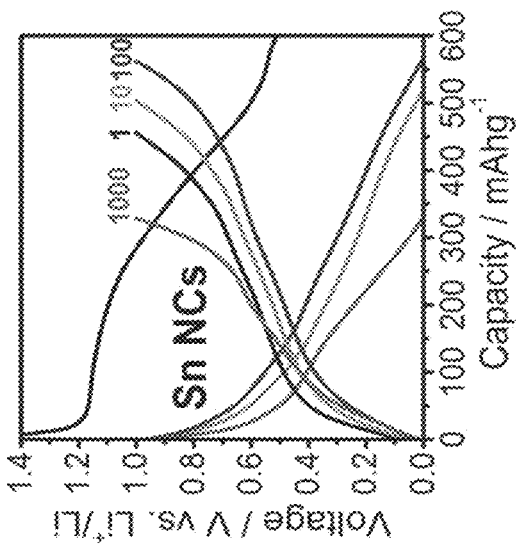
Figure 6A:
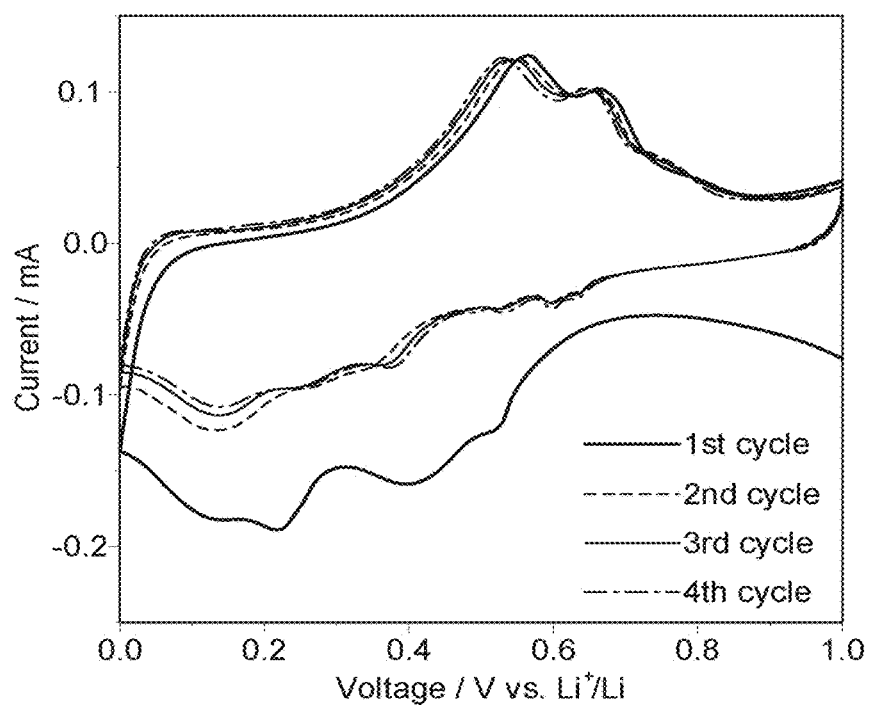
FIGS. 6A-6C. Cyclic voltammogram of Sn NCs (FIG. 6A), $CoSn_2$ NCs (FIG. 6B) and $CoSn_x$ NPs (FIG. 6C) tested in a lithium-ion half-cell using a scan rate of $0.1\ Vs^{-1}$ in the potential range 0.005-1.0 V FIG. 7. Rate capability measurements for Sn NCs, $CoSn_2$ NCs and $CoSn_x$ NPs in Lithium-ion half-cells within the potential range 0.005-1.0 V FIGS. 8A-8B.
Figure 6B:
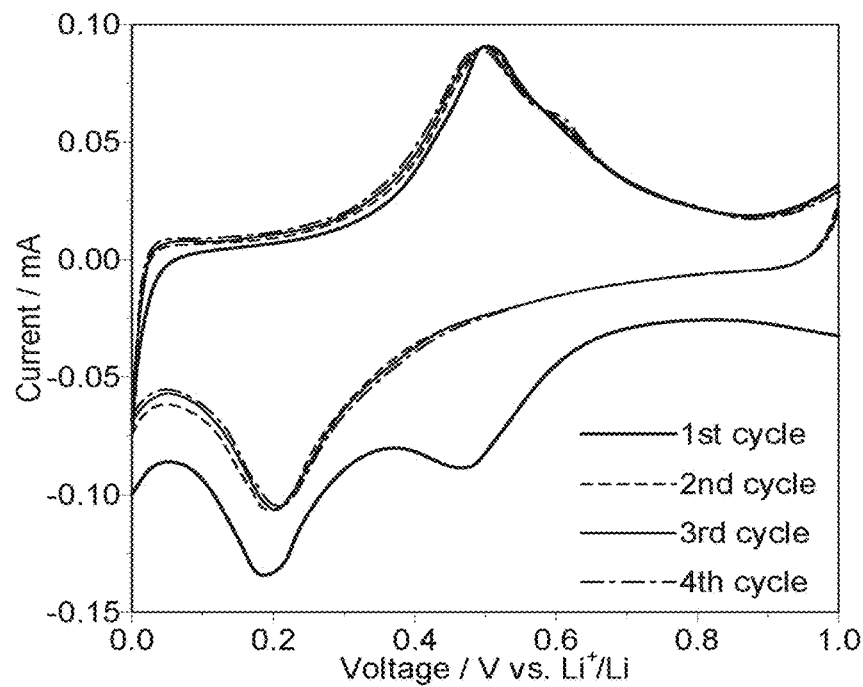
Figure 6C:
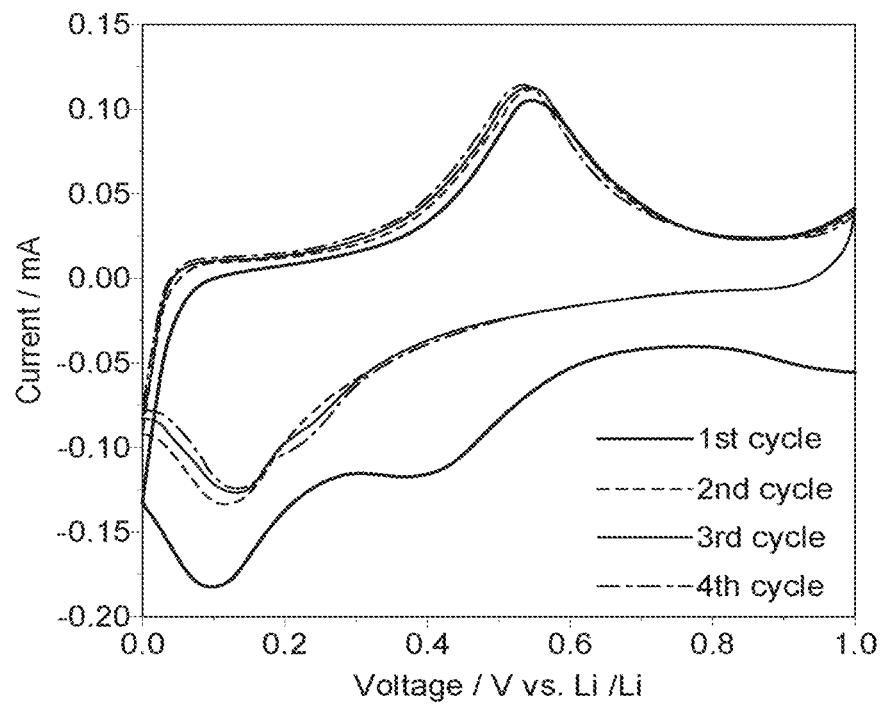

The reaction yield was 460 mg (98%). The XRD pattern of the obtained product showed that amorphous Co NPs were obtained. FIG. 2 shows the EDX-spectrum of amorphous Co NPs. The peak corresponding to S (about 1 wt % of the sample) might be attributed to residual DMSO. Analysis of the reaction product by TEM showed that particles were polydisperse with sizes of 4-7 nm range (FIG. 3A).

Synthesis of $CoSn_2$ Nanocrystals (NCs):

For the preparation of Co—Sn based NCs, 1.4 mmol of Sn NCs prepared as above were ball-milled for 4 hours with 0.7 mmol of Co NPs prepared as above, at a frequency of 30 $s^{-1}$. The beaker for ball-milling was loaded under nitrogen atmosphere and sealed.

The reaction yield was 200 mg (96%). The XRD pattern of the obtained product showed that ball-milling under inert conditions resulted in the formation of crystalline $CoSn_2$ nanoalloys (reference patterns: tetragonal $SnO_2$, space group P42/mnm (136), a=4.7391 Å, c=3.1869 Å, ICDD PDF entry 00-077-0448; tetragonal $CoSn_2$, space group I4/mcm (140), a=6.363 Å, c=5.456 Å, ICDD PDF entry 00-025-0256). Analysis of the reaction product by TEM showed that particles were polydisperse with sizes of 6-20 nm (FIG. 3D).

Example 2: Synthesis of $CoSn_x$ Nanoparticles (NPs)

For the preparation of Co—Sn based NPs, 1.4 mmol of Sn NCs prepared as above were ball-milled for 4 hours with 0.7 mmol of Co NPs prepared as above, at a frequency of 30 $s^{-1}$. The beaker for ball-milling was loaded in air.

The reaction yield was 200 mg (96%). The XRD pattern of the obtained product showed that ball-milling in air resulted in the formation of amorphous $CoSn_x$ NPs. The major fraction of the samples amorphizes, with only small features corresponding to $SnO_2$ at 34° and $CoSn_2$ at 35.5°. Analysis of the reaction product by TEM showed that particles were polydisperse with sizes of 6-20 nm (FIG. 3C).

III. Preparation of Co—Sn-Based Electrodes, Cell Assembly and Electrochemical Measurements For electrode preparation, aqueous slurries were prepared by mixing the respective NPs (64 wt. %) with CB (21 wt. %), CMC (15 wt. %) and water as solvent by ball-milling at 500 rpm for 1 hour. The resulting slurries were coated onto copper current collectors, which were dried at 80° C. under vacuum for 12 hours prior to battery assembly. Electrochemical measurements were conducted in air tight coin-type cells assembled in an Ar-filled glove box ($O_2$<0.1 ppm, $H_2O$<0.1 ppm) using either elemental lithium for lithium-ion half-cell tests or $LiCoO_2$ on aluminium foil (MTI) for lithium-ion full-cell tests. A piece of glass microfiber was used as separator. As electrolyte 1M $LiPF_6$ in EC:DMC with 3% FEC was used. FEC is added to the electrolyte to improve cycling stability. Galvanostatic cycling tests were carried out at room temperature on MPG2 multi-channel workstation (BioLogic). Capacities were normalized by the mass of Co—Sn nanoparticles for both half and full-cell tests, excluding CB and the binder.

IV. Characterization

Transmission Electron Microscopy (TEM) images were obtained with a Philips CM30 TEM microscope at 300 kV using carbon-coated Cu grids as substrates (Ted-Pella). Energy-dispersive X-ray spectroscopy (EDX) measurements were carried out using a NanoSEM 230. Powder X-ray diffraction (XRD) was measured on a STOE STADI P powder X-ray diffractometer.

V. Electrochemical Results

FIG. 4 shows the capacity retention of Co—Sn based NPs over 1500 cycles at a high current of 1984 $mAg^{-1}$ in the potential range 0.005-1.0 V. The current of 1984 $mAg^{-1}$ corresponds to a rate of 2 C for Sn based on the theoretical capacity of 992 $mAhg^{-1}$ for the formation of $Li_{4.4}Sn$. Assuming that Co does not contribute to the capacity, the theoretical capacity of $CoSn_x$ NPs and $CoSn_2$ NCs is with 795 $mAhg^{-1}$ accordingly lower compared to pure Sn. For galvanostatic cycling tests the upper cut-off potential was limited to 1.0 V in order to only include processes corresponding to high energy density in full-cells. As can be seen in FIG. 4 for galvanostatic cycling at 1984 $mAg^{-1}$ Sn NCs as well as $CoSn_x$ NPs and $CoSn_2$ NCs show capacities of ~570 $mAhg^{-1}$, after rapid increase of the capacity during the first 100 cycles. Whereas Sn NCs show significant capacity fading after 400 cycles, Co—Sn based NPs show much better capacity retention. In particular, for $CoSn_2$ NCs after 1500 cycles still 462 $mAhg^{-1}$ are retained. For $CoSn_x$ NPs capacity retention is even better with 525 $mAhg^{-1}$ corresponding to only 8% fading over 1500 cycles at a current of 1984 $mAg^{-1}$. Therefore the $CoSn_x$ NPs obtained by the method of the invention have an ultrahigh cycling stability. The superior cycling stability of $CoSn_x$ NPs involving Co compared to pure Sn NCs might be attributed to two effects. Due to the fact that Co does not form lithium-alloys it can serve as inactive matrix during cycling and therefore buffer the volume changes caused by the lithiation/delithiation of Sn. Moreover, the presence of Co can prevent Sn NCs from aggregation and therefore further improve cycling stability. The difference between $CoSn_2$ NCs and $CoSn_x$ NPs in terms of cycling stability might be attributed to the fact that $CoSn_x$ NPs are more oxidized due to their preparation by ball-milling in air. The higher content of oxides possibly results in the formation of a more effective $Li_2O$ matrix to buffer volume changes and inhibit sintering of Sn domains during cycling. It should be noted that for all three systems the average coulombic efficiency is 99.6% during cycling, after values of ~30% were obtained for the first discharge cycle due to the solid electrolyte formation. The average delithiation potential for Sn NCs, $CoSn_2$ NCs and $CoSn_x$ NPs are equally low with a stable value of ~0.5 V vs. $Li^+/Li$ during cycling (FIGS. 5A-5C and FIGS. 6A-6C).

Figure 7:
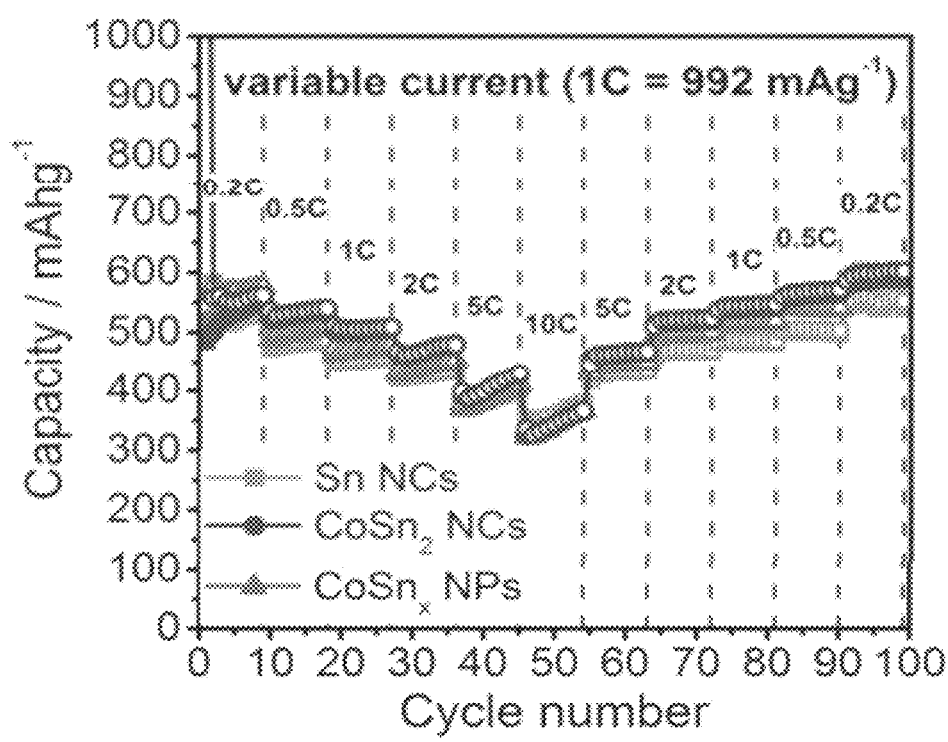

To evaluate the rate capability of the Co—Sn based NPs, galvanostatic cycling tests at current rates between 0.2 C to 10 C were carried out (FIG. 7, 1 C=992 $mAg^{-1}$). Due to the small size of the NPs and therefore enhanced reaction kinetics in all cases similarly good rate capability was observed, though for currents of 0.5 C-2 C Sn NCs showed by ~50 $mAhg^{-1}$ lower capacities compared to $CoSn_2$ NCs. For rates as high as 10 C all three materials still retain a capacity of ~350 $mAhg^{-1}$. Interestingly, it can be observed that at such high current capacities increase during cycling, resulting in same or even higher capacities were obtained during stepwise decrease of the rate back to 0.2 C. Especially for CoSn$_x$ NPs the slight difference in capacity to CoSn$_2$ NCs observed initially at the rates of 0.5 C-2 C diminishes fully during cycling.

In order to test the applicability of Co—Sn based NPs under more practical conditions, anode-limited full-cell tests using LiCoO$_2$ as cathode were carried out. CoSn$_x$ NPs were chosen as anode material, because of their superior capacity retention compared to Sn and CoSn$_2$ NCs. Herein, all capacities and currents are related to the mass of CoSn$_x$ NPs. Full-cells of CoSn$_x$ NPs/LiCoO$_2$ were initially charged to 2000 mAhg$^{-1}$ to account for the irreversible charge loss in the first cycle. For subsequent cycling charge and discharge were limited to 500 mAhg$^{-1}$. Cycled under these conditions at a current of 500 mAg$^{-1}$ CoSn$_x$ NPs show stable capacities with an average discharge voltage of 3.2 V for 50 cycles. Based on the anode capacity and discharge voltage one roughly estimates the specific energy density of CoSn$_x$ NPs to be comparable to graphite (372 mAhg$^{-1}$, 3.6 V vs. LiCoO$_2$). However, given the much higher density of bulk β—Sn (~7.3 gcm$^{-3}$) and Co (~8.9 gcm$^{-3}$) compared to graphite (~2.2 gcm$^{-3}$) using CoSn$_x$ NPs can potentially improve the volumetric energy density by up to factor 4.

Figure 8A:
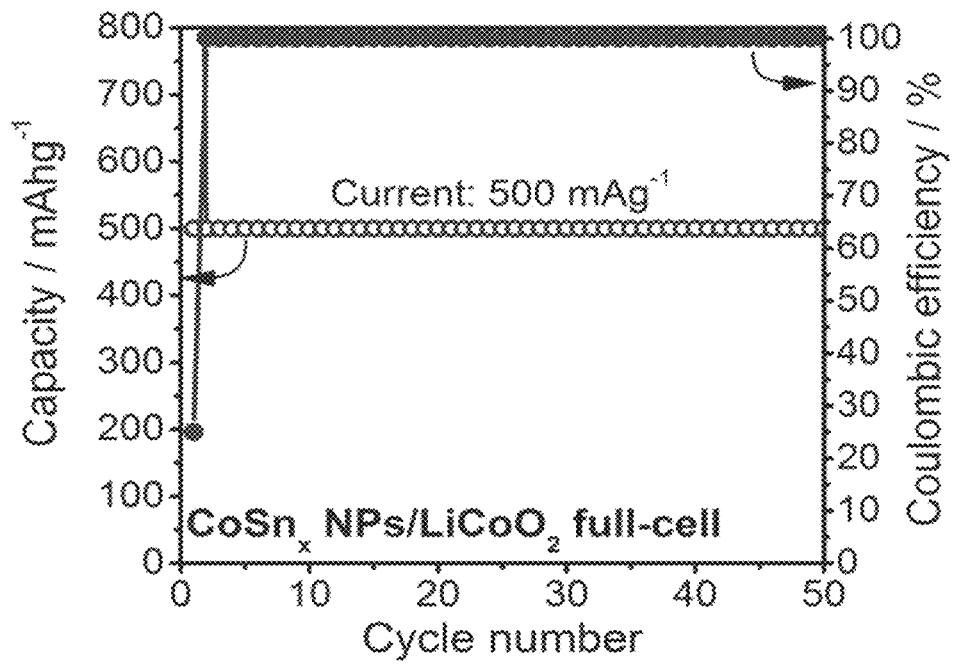
(FIG. 8A) Capacity retention for a $CoSn_x$ NPs lithium-ion full-cell with $LiCoO_2$ as cathode material at a current of 500 $mAg^{-1}$ and (FIG. 8B) galvanic charge/discharge curves for the $CoSn_x/LiCoO_2$ full cell corresponding to (FIG. 8A) with the average discharge voltage as inset.
Figure 8B:
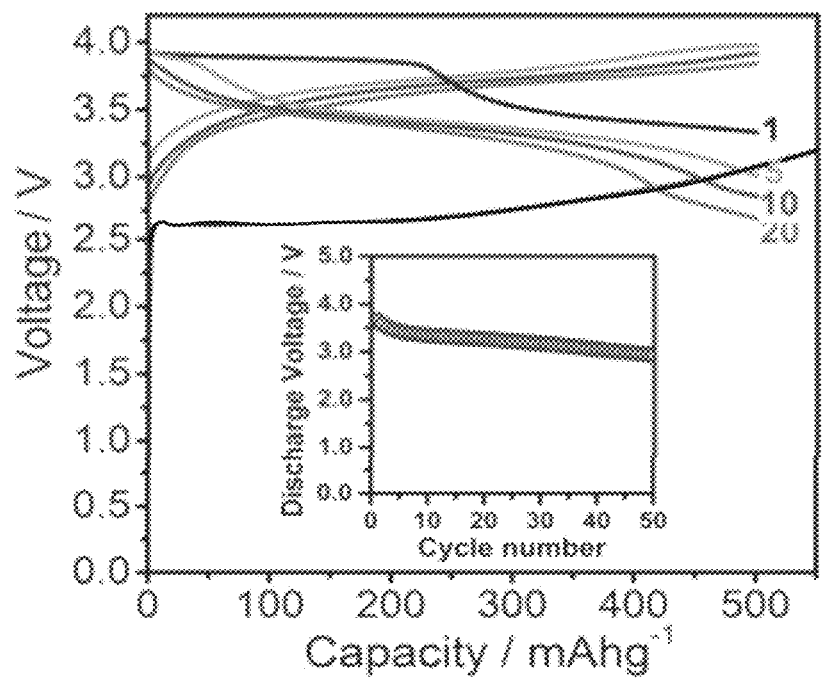

FIGS. 8A-8B show the electrochemical performance of a CoSn$_x$ NPs lithium-ion full-cell with LiCoO$_2$ as cathode material: FIG. 8A: Capacity retention at a current of 500 mAg$^{-1}$. FIG. 8B: Galvanostatic charge/discharge curves for the SnSb/LiCoO$_2$ full cell corresponding to (FIG. 8A) with the average discharge voltage as inset. Cells were cycled with limitation of charge and discharge capacity to 500 mAhg$^{-1}$. Displayed capacities and currents are related to the mass of CoSn$_x$ NPs.

In conclusion, the method of the invention allows to synthesize Co NPs and Sn NCs with diameters nm via simple reduction of the respective metal chlorides with NaBH$_4$ in NMP and subsequently converted them into intermetallic crystalline and amorphous Co—Sn nanoalloys by ball-milling. Though CoSn$_2$ NCs show good cycling stability for several hundred cycles, amorphous CoSn$_x$ NPs show outstanding capacity retention with only 8% fading over 1500 cycles at 1984 mAg$^{-1}$. In addition, tested in lithium-ion full-cells with LiCoO$_2$ as cathode material CoSn$_x$ NPs provide stable capacities of 500 mAhg$^{-1}$ with an average discharge voltage of 3.2 V. Given the inexpensive and easily upscalable preparation method and their excellent electrochemical properties characterized by high cyclability as well as high volumetric and specific energy densities, the herein presented CoSn$_x$ NPs have a great potential as high-performance anode materials for Li-ion and Na-ion batteries While there are shown and described presently preferred embodiments of the invention, it is to be distinctly understood that the invention is not limited thereto but may be otherwise variously embodied and practiced within the scope of the following claims.

REFERENCES

[1] a) P. G. Bruce, B. Scrosati, J.-M. Tarascon, Angew. Chem. Int. Ed. 2008, 47, 2930-2946; b) M. F. Oszajca, M. I. Bodnarchuk, M. V. Kovalenko, Chem. Mater. 2014, 26, 5422-5432.
[2] a) A. D. W. Todd, R. E. Mar, J. R. Dahn, J. Electrochem. Soc. 2007, 154, A597-A604; b) X.-L. Wang, W.-Q. Han, J. Chen, J. Graetz, ACS Appl. Mater. Interfaces 2010, 2, 1548-1551.

What is claimed is:

1. A method for producing MSnx nanoparticles, wherein:
M is an element selected from the group consisting of Co, Mn, Fe, Ni, Cu, In, Al, Ge, Pb, Bi, Ga;
0<x≤10; and
the MSnx nanoparticles are amorphous nanoparticles,
the method comprising:
separately synthesizing Sn nanoparticles and M nanoparticles by, in either order:
synthesizing the Sn nanoparticles by reducing a tin salt with a solution of a first hydride in a first anhydrous polar solvent, separating solid Sn nanoparticles formed from the solution, and washing the Sn nanoparticles, and
synthesizing the M nanoparticles by reducing a metal salt with a solution of a second hydride in a second anhydrous polar solvent, separating solid M nanoparticles formed from the solution, and washing the M nanoparticles; and then
mechanically mixing the Sn nanoparticles and the M nanoparticles to obtain the amorphous MSnx nanoparticles.

2. The method according to claim 1, wherein a molar ratio of the M nanoparticles and the Sn nanoparticles in the mechanical mixing is 1:1 to 1:3.

3. The method according to claim 1, wherein the mechanical mixing occurs by ball-milling.

4. The method according to claim 3, wherein the ball-milling is performed in the presence of an inert gas.

5. The method according to claim 4, wherein the ball-milling is performed in the presence of nitrogen.

6. The method according to claim 3, wherein the ball-milling is performed in air.

7. The method according to claim 1, wherein M is Co.

8. The method according to claim 1, wherein the reducing of the tin salt occurs at a temperature from 50° C. to 70° C.

9. The method according to claim 1, wherein the reducing of the metal salt occurs at a temperature from 60° C. to 180° C.

10. The method according to claim 1, wherein the first hydride is selected from the group consisting of NaBH4, lithium hydride, sodium hydride, potassium hydride, magnesium hydride, calcium hydride, tributyltinhydride, diisobutyl aluminum hydride, lithium aluminum hydride, lithium triethylborohydride and mixtures thereof.

11. The method according to claim 10, wherein the first hydride is NaBH4.

12. The method according to claim 10, wherein the second hydride is NaBH4.

13. The method according to claim 1, wherein the first anhydrous polar solvent is selected from the group consisting of 1-methyl-2-pyrrolidone (NMP), hexamethylphosphoramide, 1,3-dimethyl-2-imidazolidinone, 1,3-dimethyl-3,4,5,6-tetrahydro-2(1H)-pyrimidinone, dimethylsulfoxide, sulfolane, glyme, diglyme, triethylene glycol dimethylether, and mixtures thereof.

14. The method according to claim 13, wherein the first anhydrous polar solvent is 1-methyl-2-pyrrolidone (NMP).

15. The method according to claim 13, wherein the second anhydrous polar solvent is 1-methyl-2-pyrrolidone (NMP).

16. The method according to claim 1, wherein the tin salt is selected from the group consisting of tin chloride, tin fluoride, tin bromide, tin iodide, tin oxide, tin sulfide, sodium stannate trihydrate, tetrabutyltin, and mixtures thereof.

17. The method according to claim 16, wherein the tin salt is tin chloride.

18. The method according to claim 1, wherein the metal salt is selected from the group consisting of M chlorides and mixtures thereof.

19. The method according to claim 18, wherein the metal salt is Co chloride.

20. The method according to claim 1, wherein the reducing of the tin salt occurs in inert gas.

21. The method according to claim 20, wherein the reducing of the tin salt occurs under nitrogen.

22. The method according to claim 20, wherein the reducing of the metal salt occurs under nitrogen.

23. The method according to claim 1, wherein the reducing of the tin salt occurs in air.

24. The method according to claim 1, wherein the synthesizing of the Sn nanoparticles comprises:
preparing the solution of the first hydride in the first anhydrous polar solvent and at least one solution of the tin salt in the first anhydrous solvent;
heating the solution of the first hydride to a reaction temperature of the reducing of the tin salt; and
starting the reducing when the reaction temperature is reached by adding the at least one solution of the tin salt into the solution of the first hydride to generate a reaction mixture.

25. The method according to claim 24, wherein the reaction mixture is cooled to room temperature immediately after the adding.

26. The method according to claim 1, wherein the synthesizing the Sn nanoparticles comprises:
preparing a solution of at least one tin salt in the first anhydrous polar solvent and at least one solution of the first hydride in the first anhydrous polar solvent;
heating the solution of the at least one tin salt to a reaction temperature of the reducing of the tin salt; and
starting the reducing when the reaction temperature is reached by adding the solution of the first hydride into the at least one solution of the tin salt to generate a reaction mixture.

27. The method according to claim 1, wherein the synthesizing the M nanoparticles comprises:
preparing the solution of the second hydride in the second anhydrous polar solvent and at least one solution of the metal salt in the second anhydrous polar solvent;
heating the solution of the second hydride to a reaction temperature of the reducing of the metal salt; and
starting the reducing when the reaction temperature of the reducing of the metal salt is reached by adding the at least one solution of the metal salt into the solution of the second hydride to generate a reaction mixture.

28. The method according to claim 1, wherein the synthesizing the M nanoparticles comprises:
preparing a solution of at least one metal salt in the second anhydrous polar solvent and at least one solution of the second hydride in the second anhydrous polar solvent;
heating the solution of the at least one metal salt to a reaction temperature of the reducing of the at least one metal salt; and
starting the reducing when the reaction temperature of the reducing of the at least one metal salt is reached by adding the at least one solution of the second hydride into the solution of the at least one metal salt to generate a reaction mixture.

29. A method for producing an anode, the method comprising:
performing the method of claim 1 for producing the MSnx nanoparticles;
mixing the MSnx nanoparticles, carbon black, carboxy methyl cellulose (CMC) and water, to obtain an aqueous slurry;
coating the aqueous slurry on a current collector, to obtain a coated current collector; and
drying the coated current collector to obtain the anode.

30. The method according to claim 1, wherein the second hydride is selected from the group consisting of NaBH4, lithium hydride, sodium hydride, potassium hydride, magnesium hydride, calcium hydride, tributyltinhydride, diisobutyl aluminum hydride, lithium aluminum hydride, lithium triethylborohydride and mixtures thereof.

31. The method according to claim 1, wherein the second anhydrous polar solvent is selected from the group consisting of 1-methyl-2-pyrrolidone (NMP), hexamethylphosphoramide, 1,3-dimethyl-2-imidazolidinone, 1,3-dimethyl-3,4,5,6-tetrahydro-2(1H)-pyrimidinone, dimethylsulfoxide, sulfolane, glyme, diglyme, triethylene glycol dimethylether, and mixtures thereof.

32. The method according to claim 1, wherein the reducing of the metal salt occurs in inert gas.

33. The method according to claim 1, wherein the reducing of the metal salt occurs in air.

* * * * *